United States Patent
Lee et al.

(10) Patent No.: US 10,194,465 B2
(45) Date of Patent: Jan. 29, 2019

(54) APPARATUS AND METHOD FOR PERFORMING USER TERMINAL SELECTION OPERATION AND BEAM FORMING OPERATION IN WIRELESS COMMUNICATION SYSTEM SUPPORTING MIMO TECHNOLOGY

(71) Applicants: Samsung Electronics Co., Ltd, Gyeonggi-do (KR); Korea Advanced Institute of Science and Technology, Daejeon (KR)

(72) Inventors: Jung-Hoon Lee, Daejeon (KR); Wan Choi, Daejeon (KR); Hyun-Kyu Yu, Gyeonggi-do (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 88 days.

(21) Appl. No.: 15/031,253

(22) PCT Filed: Sep. 24, 2014

(86) PCT No.: PCT/KR2014/008883
§ 371 (c)(1),
(2) Date: Apr. 21, 2016

(87) PCT Pub. No.: WO2015/060548
PCT Pub. Date: Apr. 30, 2015

(65) Prior Publication Data
US 2016/0262181 A1 Sep. 8, 2016

(30) Foreign Application Priority Data

Oct. 21, 2013 (KR) .......................... 10-2013-0125358

(51) Int. Cl.
*H04B 7/00* (2006.01)
*H04W 74/02* (2009.01)
(Continued)

(52) U.S. Cl.
CPC .............. *H04W 74/02* (2013.01); *H04B 7/04* (2013.01); *H04B 7/0417* (2013.01);
(Continued)

(58) Field of Classification Search
CPC ....... H04L 25/03891; H04L 25/03949; H04W 76/02; H04W 76/04; H04W 16/28
(Continued)

(56) References Cited

U.S. PATENT DOCUMENTS

| 6,917,820 | B2* | 7/2005 | Gore | ................... | H04B 7/0691 |
| | | | | | 370/334 |
| 7,428,269 | B2* | 9/2008 | Sampath | .............. | H04B 7/0417 |
| | | | | | 375/267 |

(Continued)

FOREIGN PATENT DOCUMENTS

KR    10-2011-0077157    7/2011

OTHER PUBLICATIONS

International Search Report dated Dec. 29, 2014 in connection with International Application No. PCT/KR2014/008883; 8 pages.
(Continued)

*Primary Examiner* — Dmitry H Levitan

(57) ABSTRACT

The present disclosure relates to a pre-5th-generation (5G) or 5G communication system to be provided for supporting higher data rates beyond 4th-generation (4G) communication system such as a long term evolution (LTE). A method of transmitting feedback information by a receiving apparatus in a wireless communication system supporting a multiple input multiple output (MIMO) scheme is provided. The method includes transmitting, to a transmitting apparatus, an antenna group identifier (ID) of one or more antenna groups used by the transmitting apparatus and feedback information including information related to channel quality which the receiving apparatus is capable of acquiring if the one or more antenna groups are used, wherein each of the antenna groups includes one or more antennas.

20 Claims, 9 Drawing Sheets

(51) Int. Cl.
   *H04B 7/04*     (2017.01)
   *H04L 1/16*     (2006.01)
   *H04B 7/0452*   (2017.01)
   *H04B 7/0417*   (2017.01)
   *H04J 11/00*    (2006.01)
   *H04L 27/10*    (2006.01)
   *H04B 7/06*     (2006.01)

(52) U.S. Cl.
   CPC ......... *H04B 7/0452* (2013.01); *H04B 7/0617* (2013.01); *H04B 7/0632* (2013.01); *H04J 11/00* (2013.01); *H04L 1/16* (2013.01); *H04L 27/10* (2013.01); *H04B 7/0628* (2013.01)

(58) Field of Classification Search
   USPC ................ 370/310, 328, 329, 334, 339, 349
   See application file for complete search history.

(56) References Cited

U.S. PATENT DOCUMENTS

| | | | |
|---|---|---|---|
| 7,483,718 B2* | 1/2009 | Catreux-Erceg | H04B 7/061 455/103 |
| 7,515,939 B2* | 4/2009 | Catreux-Erceg | H04B 7/061 375/347 |
| 8,275,063 B2* | 9/2012 | Kim | H04B 7/0608 341/173 |
| 8,416,877 B2 | 4/2013 | Lee et al. | |
| 8,532,217 B2* | 9/2013 | Ko | H04B 7/0413 375/267 |
| 8,548,385 B2* | 10/2013 | Sofer | H04B 7/0608 342/350 |
| 8,644,231 B2* | 2/2014 | Chun | H04B 7/0632 370/329 |
| 8,781,015 B2* | 7/2014 | Lee | H04L 25/03343 375/260 |
| 8,787,183 B2* | 7/2014 | Mallik | H04B 7/0417 370/252 |
| 9,356,662 B2* | 5/2016 | Chun | H04B 7/024 |
| 2011/0044193 A1 | 2/2011 | Forenza et al. | |
| 2011/0158340 A1* | 6/2011 | Swanson | H04B 7/022 375/267 |
| 2011/0164510 A1* | 7/2011 | Zheng | H04B 7/0626 370/252 |
| 2012/0170674 A1 | 7/2012 | Kim et al. | |
| 2012/0213310 A1 | 8/2012 | Ko et al. | |
| 2012/0243513 A1 | 9/2012 | Fujishima et al. | |
| 2012/0322492 A1 | 12/2012 | Koo et al. | |

OTHER PUBLICATIONS

Masoud Sharif, et al., "On the Capacity of MIMO Broadcast Channels with Partial Side Information", IEEE Transactions on Information Theory, vol. 31, No. 2, Feb. 2005, 17 pages.

* cited by examiner

APPARATUS AND METHOD FOR PERFORMING USER TERMINAL SELECTION OPERATION AND BEAM FORMING OPERATION IN WIRELESS COMMUNICATION SYSTEM SUPPORTING MIMO TECHNOLOGY

CROSS-REFERENCE TO RELATED APPLICATION(S)

The present application claims priority under 35 U.S.C. § 365 to International Patent Application No. PCT/KR2014/008883 filed Sep. 24, 2014, entitled "APPARATUS AND METHOD FOR PERFORMING USER TERMINAL SELECTION OPERATION AND BEAM FORMING OPERATION IN WIRELESS COMMUNICATION SYSTEM SUPPORTING MIMO TECHNOLOGY", and, through International Patent Application No. PCT/KR2014/008883, to Korean Patent Application No. 10-2013-0125358 filed Oct. 21, 2013, each of which are incorporated herein by reference into the present disclosure as if fully set forth herein.

TECHNICAL FIELD

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a D2D communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

The present disclosure relates to an apparatus and a method for performing a user equipment (UE) selection operation and a beamforming operation in a wireless communication system supporting a multiple input multiple output (MIMO).

BACKGROUND

In general, a signal transmission apparatus uses channel information between the signal transmission apparatus and a signal reception apparatus in a wireless communication system, thereby significantly improving total system performance of the wireless communication system.

Differing with a time division duplexing (TDD) communication system for acquiring channel information on a downlink channel by using channel information on an uplink channel, the signal transmission apparatus should receive feedback information indicating channel information from the signal reception apparatus since the uplink channel and the downlink channel are independent from each other in a frequency division duplexing (FDD) communication system in which a frequency used in the uplink and a frequency used in the downlink are different from each other. Here, resources used for transmitting the feedback information deteriorate resource efficiency of the FDD communication system and cannot help being limited, and thus an efficient feedback scheme is required. The feedback information is generated by quantizing the channel information, and resources used for transmitting/receiving the feedback information are feedback resources.

When the signal transmission apparatus uses the feedback information, the performance of the FDD communication system deteriorates. Particularly, when the FDD communication system corresponds to a multi-user multi-antenna system for simultaneously providing a service to a plurality of UEs, the performance more seriously deteriorates due to the use of the feedback information. Accordingly, the need for the efficient channel feedback scheme further increases in the multi-user multi-antenna system.

Meanwhile, the performance of the wireless communication system using limited feedback resources may increase through selection of an efficient UE. Here, each of the UEs that receive the service from the wireless communication system should transmit not only feedback information but also performance information related to the performance, which each of the UEs can acquire, to a base station (BS) in order to enable the BS to efficiently select the UE. Further, the BS may select an optimal UE based on the feedback information and the performance information received from each of the UEs and provide the service to the selected UE.

Meanwhile, research on a large MIMO (Large-MIMO) using many antennas to increase the performance of a multi-antenna system is being actively progressed. However, in the Large-MIMO communication system, since a channel dimension increases, an amount of feedback information which should be received from UEs significantly increases. Further, when the number of UEs increases, a UE selection and transmission beam design scheme having low complexity and acquiring high performance is required.

Meanwhile, in the conventional wireless communication system, research of quantitatively analyzing system performance deterioration of the wireless communication system when the number of feedback information bits, which can be used per UE, is given has been mainly progressed. Further, in the conventional wireless communication system, research on how to quantize required feedback information under given feedback capacities and research on how to form a transmission beam based on the quantized feedback information have been mainly progressed.

Moreover, in the conventional wireless communication system, the use of multiple antennas was considered in the research on the feedback information, but the Large-MIMO scheme using a relatively large number of antennas, for example, dozens or more of antennas has not been considered.

In addition, in the conventional wireless communication system, research on which UE should be selected and how to apply a beamforming scheme when many UEs exist under a limited feedback environment has not been actively progressed.

Accordingly, the need for a scheme for performing a UE selection operation and a beamforming operation suitable for a wireless communication system using a beamforming scheme while using a MIMO scheme has arisen. Further, the need for a scheme for transmitting/receiving feedback information to efficiently perform a UE selection operation and a beamforming operation in a wireless communication system using a beamforming scheme while using a MIMO scheme has arisen.

Meanwhile, the aforementioned information is disclosed only as background information for helping in understanding the present disclosure. No decision and no opinion on whether any of the above content can be applied as the prior art of the present disclosure have been made yet.

SUMMARY

An embodiment of the present disclosure suggests an apparatus and a method for performing a UE selection operation and a beamforming operation in a wireless communication system supporting a MIMO scheme.

Further, an embodiment of the present disclosure suggests an apparatus and a method for transmitting/receiving feedback information to efficiently perform a UE selection operation and a beamforming operation in a wireless communication system supporting a MIMO scheme.

Moreover, an embodiment of the present disclosure suggests an apparatus and a method for performing a UE selection operation and a beamforming operation by minimizing feedback resources in a wireless communication system supporting a MIMO scheme.

In accordance with an apparatus suggested by an embodiment of the present disclosure, a receiving apparatus in a wireless communication system supporting a multiple input multiple output (MIMO) scheme is provided. The receiving apparatus includes: a transmitter configured to transmit, to a transmitting apparatus, an antenna group identifier (ID) of one or more antenna groups used by the transmitting apparatus and feedback information including information related to channel quality which the receiving apparatus is capable of acquiring if the one or more antenna groups are used, wherein each of the antenna groups includes one or more antennas.

In accordance with another apparatus suggested by an embodiment of the present disclosure, a transmitting apparatus in a wireless communication system supporting a multiple input multiple output (MIMO) scheme is provided. The transmitting apparatus includes: a receiver configured to receive, from a receiving apparatus, an antenna group identifier (ID) of one or more antenna groups used by the transmitting apparatus and feedback information including information related to channel quality which the receiving apparatus is capable of acquiring if the one or more antenna groups are used, wherein each of the antenna groups includes one or more antennas.

In accordance with a method suggested by an embodiment of the present disclosure, a method of transmitting feedback information by a receiving apparatus in a wireless communication system supporting a multiple input multiple output (MIMO) scheme is provided. The method includes: transmitting, to a transmitting apparatus, an antenna group identifier (ID) of one or more antenna groups used by the transmitting apparatus and feedback information including information related to channel quality which the receiving apparatus is capable of acquiring if the one or more antenna groups are used, wherein each of the antenna groups includes one or more antennas.

In accordance with another method suggested by an embodiment of the present disclosure, a method of receiving feedback information by a transmitting apparatus in a wireless communication system supporting a multiple input multiple output (MIMO) scheme is provided. The method includes: receiving, from a receiving apparatus, an antenna group identifier (ID) of one or more antenna groups used by the transmitting apparatus and feedback information including information related to channel quality which the receiving apparatus is capable of acquiring if the one or more antenna groups are used, wherein each of the antenna groups includes one or more antennas.

Other aspects, gains, and core features of the present disclosure are processed with additional drawings, and they are apparent to those skilled in the art from the following detailed description including exemplary embodiments of the present disclosure.

Prior to processing the detailed description of the present disclosure below, configuring definitions of specific words and phrases used in this patent document may be effective. The terms "include", "comprise", and derivatives thereof may mean inclusion without limitation, the term "or" may have an inclusive meaning and means "and/or", the phrases "associated with", "associated therewith", and derivatives thereof may mean to include, be included within, interconnect with, contain, be contained within, connected to or with, coupled to or with, be communicable with, cooperate with, interleave, juxtapose, be proximate to, be bound to or with, have, and have a property of, the term "controller" may mean any device, system, or a part thereof that controls at least one operation, and such a device may be implemented in hardware, firmware, or software, or some combinations of at least two of the same. It should be noted that the functionality associated with any particular controller may be centralized or distributed, whether locally or remotely. Definitions for certain words and phrases are provided throughout this patent document, and those skilled in the art should understand that in many, if not most instances, such definitions apply to prior, as well as future uses of such defined words and phrases.

BRIEF DESCRIPTION OF THE DRAWINGS

The above and other aspects, features, and advantages, according to specific exemplary embodiments of the present disclosure, will be more apparent from the following detailed description taken in conjunction with the accompanying drawings, in which.

It should be noted that similar reference numerals are used to indicate identical or similar elements, features, and structures through the above figures.

DETAILED DESCRIPTION

Figure 1:
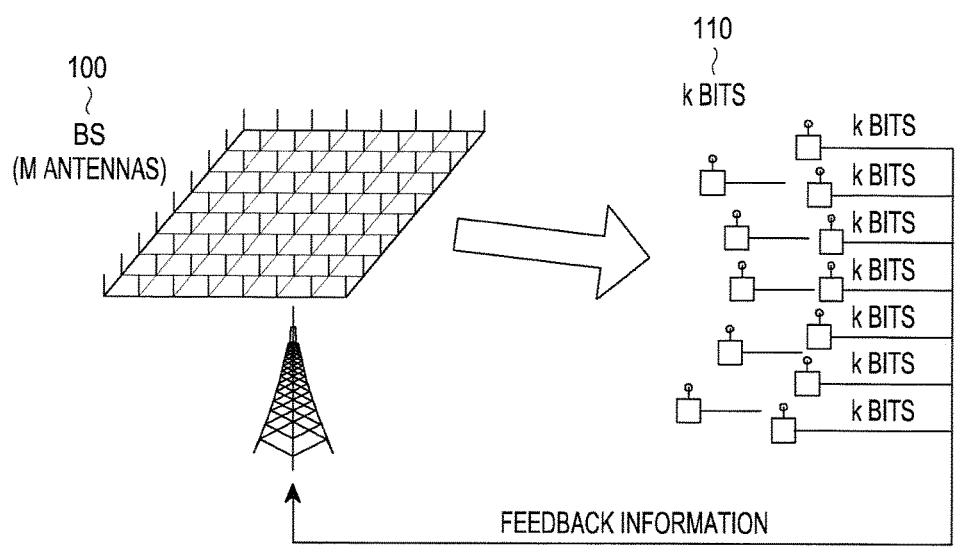
FIG. 1 schematically illustrates a structure of a Large-MIMO wireless communication system according to an embodiment of the present disclosure.

Hereinafter, embodiments of the present disclosure will be described in detail with reference to the accompanying drawings. In the following description, it should be noted that only portions required for comprehension of operations according to the embodiments of the present disclosure will be described and descriptions of other portions will be omitted not to make subject matters of the present disclosure obscure. Meanwhile, terms described later are defined in consideration of the functions of the present disclosure, but the meaning of the terms may be changed according to a user, intention of an operator, or convention. Therefore, the definitions of the terms should be made based on the contents throughout the specification.

The present disclosure may have various modifications and various embodiments, among which specific embodiments will now be described more fully with reference to the accompanying drawings. However, it should be understood that the present disclosure is not limited to the specific embodiments, but the present disclosure includes all modifications, equivalents, and alternatives within the spirit and the scope of the present disclosure.

Further, it will be appreciated that singular expressions such as "an" and "the" include plural expressions as well, unless the context clearly indicates otherwise. Accordingly, as an example, a "component surface" includes one or more component surfaces.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

The terms used in this application is for the purpose of describing particular embodiments only and is not intended to limit the disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

According to various embodiments of the present disclosure, an electronic device may include a communication functionality. The terminal may, for example, be a smart phone, a tablet personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, or a wearable device (e.g., head-mounted device (HMD), electronic clothes, an electronic bracelet, an electronic necklace, an electronic appcessory, an electronic tattoo, or a smart watch).

According to various embodiments of the present disclosure, the electronic device may be a smart home appliance with a communication functionality. The smart home appliance may, for example, be a television, a digital video disk (DVD) player, an audio player, a refrigerator, an air conditioner, a vacuum cleaner, an oven, a microwave, a washer, a drier, an air purifier, a set-top box, a TV box (e.g., Samsung HomeSync™, Apple TV™, or Google TV™), a gaming console, an electronic dictionary, a camcorder, or an electronic photo frame.

According to various embodiments of the present disclosure, the electronic device may be a medical appliance (e.g., magnetic resonance angiography (MRA) device, magnetic resonance imaging (MRI) device, computed tomography (CT) device, an imaging device, or ultrasonic device), a navigation device, a global positioning system (GPS) receiver, an event data recorder (EDR), a flight data recorder (FDR), an automotive infotainment device, a marine electronic device (e.g., ship navigation device, a gyroscope, or a compass), avionics, a security device, or an industrial or home robot.

According to various embodiments of the present disclosure, the electronic device may be a part of furniture or a building/structure, an electronic board, an electronic signature receiving device, a projector, and various kinds of measuring instruments (e.g., water meter, electric meter, gas meter, and electromagnetic wave meter), each of which has a communication functionality.

According to various embodiments of the present disclosure, the electronic device may be a combination of the above-mentioned devices. Further, it will be apparent to those skilled in the art that the terminal according to various embodiments of the present disclosure is not limited to the above-mentioned devices.

According to various embodiments of the present disclosure, a user equipment (UE) may be, for example, an electronic device.

An embodiment of the present disclosure suggests an apparatus and a method for performing a UE selection operation and a beamforming operation in a wireless communication system using a multiple input multiple output (MIMO) scheme.

Further, an embodiment of the present disclosure suggests an apparatus and a method for transmitting/receiving feedback information to efficiently perform a UE selection operation and a beamforming operation in a wireless communication system using a MIMO scheme.

Moreover, an embodiment of the present disclosure suggests an apparatus and a method for performing a UE selection operation and a beamforming operation by minimizing feedback resources in a wireless communication system using a MIMO scheme.

In addition, an apparatus and a method for performing a UE selection operation suggested by an embodiment of the present disclosure will be described based on a wireless communication system using a large MIMO (Large-MIMO) scheme as an example.

Meanwhile, an apparatus and a method for performing a UE selection operation suggested by an embodiment of the present disclosure may be applied to a method and an apparatus suggested by an embodiment of the present disclosure when various communication systems such as a digital video broadcasting system including a mobile broadcasting service like a digital multimedia broadcasting (DMB) service, a digital video broadcasting-handheld (DVP-H) service, and an advanced television systems committee-mobile/handheld (ATSC-M/H) service and an internet protocol television (IPTV) service, a moving picture experts group (MPEG) media transport (MMT) system, an evolved packet system (EPS), a long-term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system of $3^{rd}$ generation partnership project 2 (3GPP2), a wideband code division multiple access (WCDMA) mobile communication system of 3GPP2, a code division multiple access (CDMA) mobile communication system of 3GPP2, and an institute of electrical and electronics engineers (IEEE) 802.16m mobile communication system also use the Large-MIMO scheme.

Further, the Large-MIMO scheme used in an embodiment of the present disclosure refers to a MIMO scheme using a preset number or more of antennas and there is no limit in the number of antennas used in the Large-MIMO scheme. Hereinafter, a wireless communication system using the Large-MIMO scheme will be referred to as a "Large-MA/10 wireless communication system" for convenience of the description.

Then, a reason why the method of transmitting/receiving feedback information used in the convention wireless communication system and the method of performing the UE selection operation and the beamforming operation are unsuitable for the Large-MIMO wireless communication system will be first described.

First, the reason why the method of transmitting/receiving the feedback information used in the conventional wireless communication system is unsuitable for the Large-MIMO wireless communication system is described.

The method of transmitting/receiving the feedback information used in the conventional wireless communication system has a problem in that the accuracy of channel information deteriorates since all UEs receiving the service feedback the channel information of all channels.

In the conventional wireless communication system, the UEs quantize channel information of all channels which the UEs experience to generate feedback information and transmit the feedback information to a signal transmission apparatus, for example, a BS, and the BS performs a beamforming operation based on the feedback information.

However, in the Large-MIMO wireless communication system, the BS has a large number of antennas. Accordingly, when channel information of channels reflecting the large number of antennas is quantized, if feedback capacities per UE are limited, a quantization error of the channel information increases. In this case, the increasing channel information quantization error significantly deteriorates total system performance of the Large-MIMO wireless communication system.

Second, the reason why the method of performing the UE selection operation and the beamforming operation used in the conventional wireless communication system is unsuitable for the Large-MIMO wireless communication system is described.

First, when a plurality of UEs exist, UE selection and beamforming matrix detection may be generally not easy even in a condition where channel information is completely known. Accordingly, when accurate feedback information is not guaranteed, complexity greatly increases in determining how many UEs should be selected among the plurality of UEs, which UEs should be selected among the plurality of UEs, and which beamforming pattern should be used to transmit/receive signals to/from the selected UEs.

Therefore, an embodiment of the present disclosure suggests a method and an apparatus for providing accurate feedback information by using minimum feedback resources and efficiently performing the UE selection operation and the beamforming operation.

Here, a structure of the Large-MIMO wireless communication system according to an embodiment of the present disclosure is described with reference to FIG. 1.

FIG. 1 schematically illustrates the structure of the Large-MIMO wireless communication system according to an embodiment of the present disclosure.

Referring to FIG. 1, the Large-MIMO wireless communication system includes a BS 100 and K UEs 110.

It is assumed that the BS 100 includes M antennas and each of the K UEs 110 uses a predetermined number of, for example, a feedback information bits. Here, the feedback information bits refer to bits included in feedback information. Further, the K UEs 110 are located at different distances from the BS 100, so that path losses of signals which the K UEs 110 receive from the BS 100 are different from each other.

Accordingly, the BS 100 according to an embodiment of the present disclosure groups the antennas included in the BS 100 into groups according to the number of UEs to which the BS provides the service and the number of feedback information bits.

The structure of the Large-MIMO wireless communication system according to an embodiment of the present disclosure has been described, and an operation process of the Large-MIMO wireless communication system according to an embodiment of the present disclosure will be next described with reference to FIG. 2.

Figure 2:
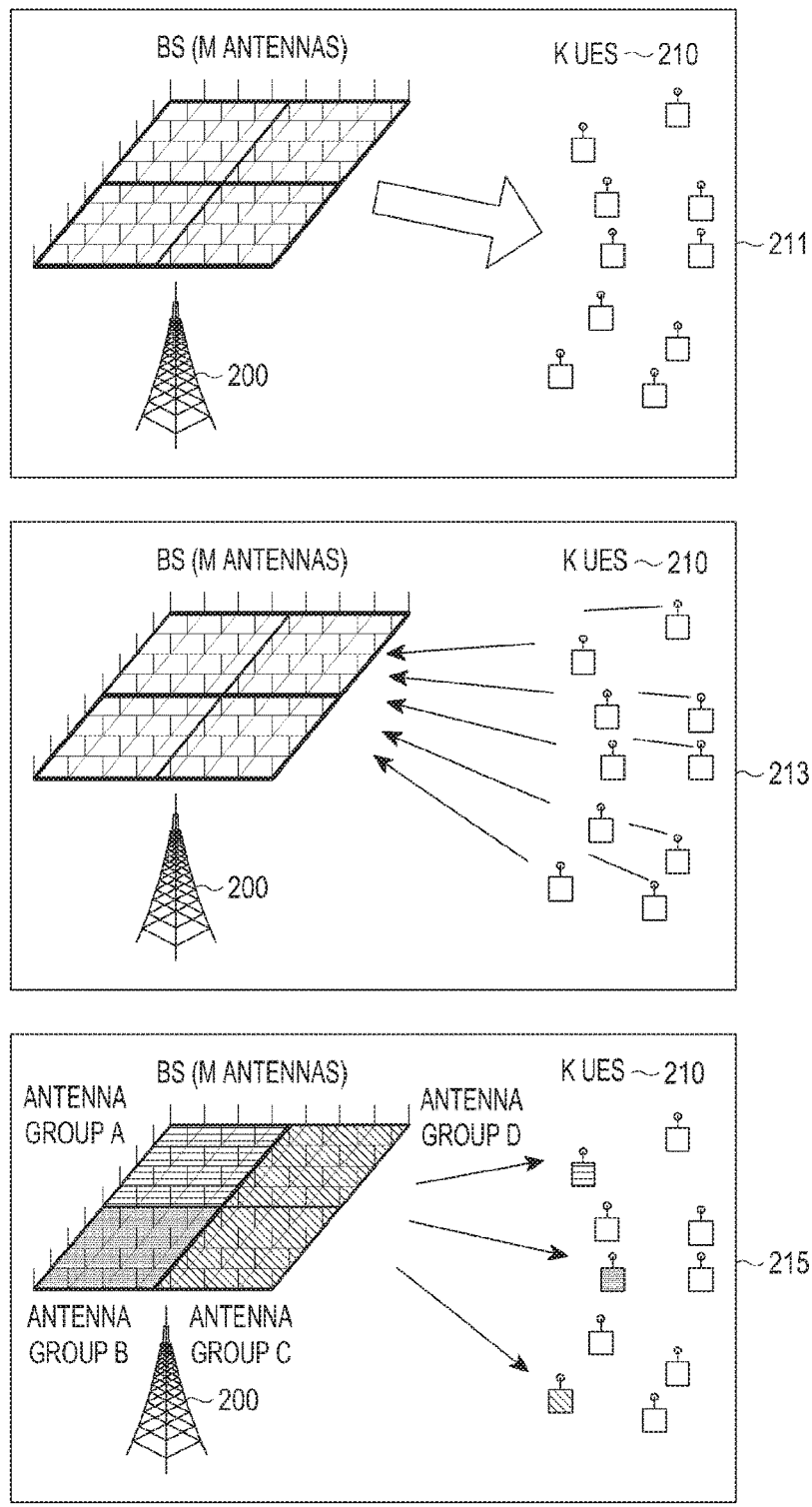
FIG. 2 schematically illustrates an operation process of the Large-MIMO wireless communication system according to an embodiment of the present disclosure.

FIG. 2 schematically illustrates the operation process of the Large-MIMO wireless communication system according to an embodiment of the present disclosure.

Referring to FIG. 2, the Large-MIMO wireless communication system includes a BS 200 and K UEs 210.

Referring to FIG. 2, the BS 200 groups all antennas included in the BS 200, for example, M antennas into S antenna groups in consideration of the number of UEs and feedback information capacity, that is, the number of feedback information bits, and transmits a reference signal, for example, a pilot signal for each of the antenna groups as indicated by reference numeral 211. Here, the reference signal is transmitted to distinguish the corresponding antenna group, and a form of the reference signal may be variously implemented.

Further, each of the K UEs 210 selects an antenna group through which each of the K UEs 210 desires to receive the service and generates information on channel quality, which the corresponding UE can acquire when antenna group information indicating the selected antenna group and the selected antenna information are used. The channel quality may be one of, for example, received signal code power (RSCP), reference signal received power (RSRP), a reference signal strength indicator (RSSI), reference signal received quality (RSRQ), a carrier to interference ratio (CIR), a signal to noise ratio (SNR), and a black error rate (BLER).

Further, each of the K UEs 210 transmits the generated feedback information to the BS 200 as indicated by reference numeral 213.

The BS 200 selects at least one UE with respect to each of the S antenna groups based on the feedback information received from the K UEs 210 and generates a beamforming matrix in consideration of the selection of the UE. Then, the BS 200 simultaneously provides the service to the selected UEs in accordance with the beamforming matrix as indicated by reference numeral 215.

The operation process of the Large-MIMO wireless communication system according to an embodiment of the present disclosure has been described in FIG. 2, and a message transmission/reception process based on the operation process of the Large-MIMO wireless communication system according to an embodiment of the present disclosure will be next described with reference to FIG. 3.

Figure 3:
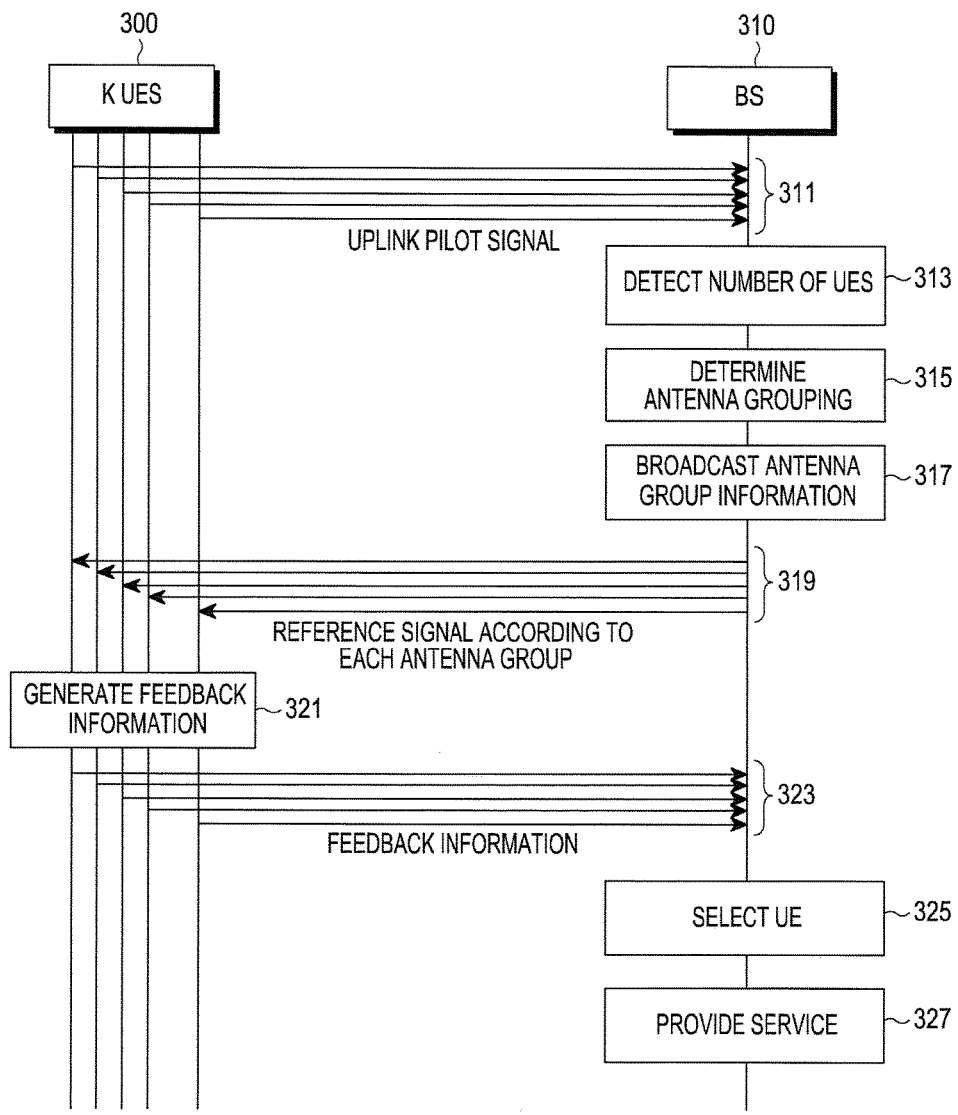
FIG. 3 schematically illustrates a message transmission/reception process based on the operation process of the Large-MIMO wireless communication system according to an embodiment of the present disclosure.

FIG. 3 schematically illustrates the message transmission/reception process based on the operation process of the Large-MIMO wireless communication system according to an embodiment of the present disclosure.

Referring to FIG. 3, the Large-MIMO wireless communication system includes K UEs 300 and a BS 310.

First, the K UEs 300 periodically transmit uplink reference signals, for example, uplink pilot signals in step 311. Here, the uplink reference signal corresponds to a signal transmitted to enable the BS 310 to detect corresponding UEs and can be implemented in various form as well as the uplink pilot signal.

The BS 310 detects the number of UEs to which the BS 310 provides the service in step 313. The BS 310 determines the number of antenna groups to group the antennas included in the BS 310 in consideration of the detected number of UEs and the number of feedback information bits in step 315.

The BS 310 broadcasts antenna group information in step 317, and transmits the reference signal according to each corresponding antenna group in step 319. Here, the antenna group information refers to information on the antenna groups and includes an identifier (ID) of each of the antenna groups and information on antennas included in the corresponding antenna group. Further, the reference signal transmitted according to each antenna group may be, for example, a pilot signal and may be implemented in various forms.

Each of the K UEs 300 receives the antenna group information and the reference signals transmitted according to each antenna group and determines which antenna group is used among the S antenna groups by using the received antenna group information and reference signals. Further, each of the K UEs 300 calculates the performance, which can be acquired, by using the determined antenna group and generates information related to the selected antenna group and the calculated performance as feedback information in step 321. Then, each of the K UEs 300 transmits the generated feedback information, which each of the K UEs 300 has generated, to the BS 310 in step 323.

The BS 310 receives the feedback information from the K UEs 300 and selects UEs based on the feedback information received from the K UEs 300. Further, the BS 310 generates a beamforming matrix in accordance with the selected UEs and provides the service to the K UEs 300 in accordance with the generated beamforming matrix.

Meanwhile, although FIG. 3 illustrates the message transmission/reception process based on the operation process of the Large-MIMO wireless communication system according to an embodiment of the present disclosure, various modifications can be made for FIG. 3. For example, although successive steps are illustrated in FIG. 3, the steps illustrated in FIG. 3 may overlap each other, may be performed in parallel, may be performed in a difference order, or may be performed several times.

The message transmission/reception process based on the operation process of the Large-MIMO wireless communication system according to an embodiment of the present disclosure has been described in FIG. 3, and a process in which the BS receives feedback information and allocates antenna groups in the Large-MIMO wireless communication system according to an embodiment of the present disclosure will be next described with reference to FIG. 4.

Figure 4:
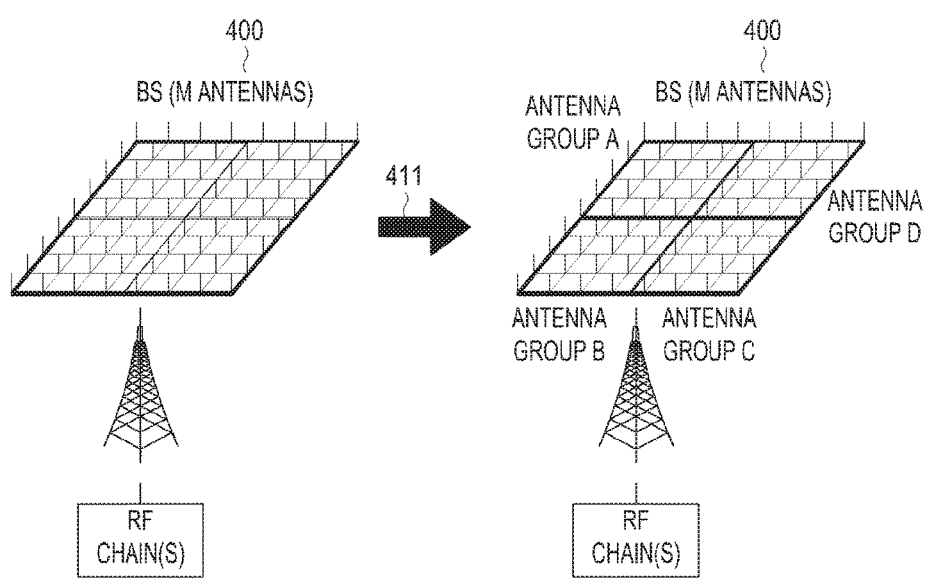
FIG. 4 schematically illustrates a process of receiving feedback information and allocating antenna groups in a Large-MIMO wireless communication system according to an embodiment of the present disclosure.

FIG. 4 schematically illustrates a process of receiving feedback information and allocating antenna groups in the Large-MIMO wireless communication system according to an embodiment of the present disclosure.

Referring to FIG. 4, it is first assumed that the BS includes a total of M antennas. The BS determines the number of antenna groups to group the M antennas according to the number of UEs to which the BS provides the service and the number of feedback information bits. Here, it is assumed that the total number of antenna groups is S, and S corresponding to the total number of antenna groups should be configured to be smaller than the number of radio frequency (RF) chains used by the BS.

When it is assumed that the M antennas are grouped into the total number of S antenna groups and the number of feedback information bits is b, the performance, which the Large-MIMO wireless communication system can acquire, may be approximated as Equation (1).

$$\mathbb{E}\left[\sum_{s \in S} \log_2\left(1 + \frac{\frac{P}{S}|h_s^\dagger v_s|^2}{1 + \sum_{i \in S \setminus \{s\}} \frac{P}{S}|h_i^\dagger v_i|^2}\right)\right] = \quad \text{Equation (1)}$$

$$E\left[\sum_{s \in S} \log_2\left(1 + \frac{P}{S}\|h_s\|^2|\bar{h}_s^\dagger v_s|^2\right)\right] -$$

$$\mathbb{E}\left[\sum_{s \in S} \log_2\left(1 + \sum_{i \in S \setminus \{s\}} \frac{P}{S}\|h_i\|^2|\bar{h}_i^\dagger v_i|^2\right)\right] \stackrel{(a)}{\approx}$$

$$S\log_2\left(1 + \frac{P}{S}\frac{M}{S(M-1)}\right) -$$

$$S\log_2\left(1 + \frac{P}{S}\mathbb{E}\left[\min_{k \in [K]} \|h_k^c\|^2\right] 2^{-\frac{bS}{(S-1)M}}\right) \stackrel{(b)}{\approx}$$

$$S\log_2\left(1 + \frac{P}{S}\frac{M}{S(M-1)}\right) - S\log_2\left(1 + \frac{P}{S}K^{-\frac{S}{(S-1)M}} 2^{-\frac{bS}{(S-1)M}}\right)$$

In Equation (1), P denotes transmission power of the BS, M denotes the number of antennas included in the BS, K denotes the number of UEs to which the BS provides the service, S denotes the number of antenna groups, $h_s$ denotes a channel of a UE using an $s^{th}$ antenna group, and $v_s$ denotes a beamforming vector applied to the $s^{th}$ antenna group.

As shown in equation 1 above, it is noted that the number of antenna groups should increase as the number of UEs increases and the number of feedback information bits increases. Accordingly, the BS should determine S corresponding to the number of antenna groups in a way to maximize the performance, which the Large-MIMO wireless communication system can acquire, as shown in Equation (1) above.

Meanwhile, the feedback information transmitted from each of the K UEs is described below.

First, each of the K UEs transmits an antenna group ID indicating an antenna group determined by the UE itself, channel direction information (CDI) corresponding to the determined antenna group, and channel quality information (CQI) indicating channel quality which can be acquired on average when the determined antenna group is used. Here, the antenna group ID, the CDI, and the CQI are generated as the feedback information, and the number of antenna group IDs included in the feedback information may be determined according to a condition of the Large-MIMO wireless communication system without limit. For example, the feedback information may include only one antenna group ID or antenna group IDs for N antenna groups among the S antenna groups.

Then, a format of the feedback information suggested by an embodiment of the present disclosure will be described with reference to Table 1 below.

TABLE 1

| Antenna group ID | CDI index | Average CQI |
|---|---|---|
| C | 1 | 9 dB |
| D | 3 | 15 dB |

As shown in Table 1 above, the feedback information includes an antenna group ID, a CDI index, and an average CQI.

As shown in Table 1 above, when the number of antenna group IDs included in the feedback information is N, N antenna groups may be selected in various forms, for example, by using a threshold value-based scheme, a ratio-based scheme, and a maximum value-based scheme, and the threshold value-based scheme, the ratio-based scheme, and the maximum value-based scheme are described below in detail.

(1) Threshold Value-Based Scheme

The threshold value-based scheme corresponds to a scheme for inserting, in the feedback information, antenna group IDs of N antenna groups having the performance, which the corresponding UE can acquire, larger than or equal to a preset threshold value among the S antenna groups.

(2) Ratio-Based Scheme

The ratio-based scheme corresponds to a scheme for inserting, in the feedback information, antenna group IDs of N antenna groups in which the performance which the corresponding UE can acquire through one antenna group is larger than the performance which the corresponding UE can acquire through two or more antenna groups by a predetermined setting ratio.

(3) Maximum Value-Based Scheme

The maximum value-based scheme corresponds to a scheme for inserting, in the feedback information, antenna group IDs of the total N number of antenna groups having high channel quality, which include an antenna group having maximum channel quality, among the S antenna groups.

Further, although it has been described above that the antenna group IDs are selected based on the threshold value-based scheme, the ratio-based scheme, and the maximum value-bases scheme, there is no limitation on the scheme for selecting the antenna group IDs.

Next, a CDI quantization scheme and a beamforming scheme according to an embodiment of the present disclosure will be described.

First, each of the K UEs quantizes the CDI of the corresponding antenna group by using a feedback information bits among b feedback information bits, and a scheme for quantizing the CDI is described below in detail.

(1) First Quantization Scheme

The first quantization scheme corresponds to a scheme in which the UE quantizes the CDI of the antenna group selected by the UE itself. Further, the UE transmits feedback information including the quantized CDI to the BS.

Then, the BS selects a UE, which can acquire maximum performance, according to each antenna group by using the feedback information received from the K UEs and provides the service to the UEs selected for each antenna group. In this case, a pre-coding sub-matrix for the corresponding antenna group is acquired from channel information of the antenna group of the BS.

Meanwhile, when the BS uses an additional transmission scheme, for example, a zero forcing (ZF), the BS can provide the service to two or more UEs by using one antenna group. Here, the additional transmission scheme may include various schemes as well as the ZF scheme, of which a detailed description is omitted. The first quantization scheme is described herein with reference to FIGS. 5A and 5B.

Figure 5A:
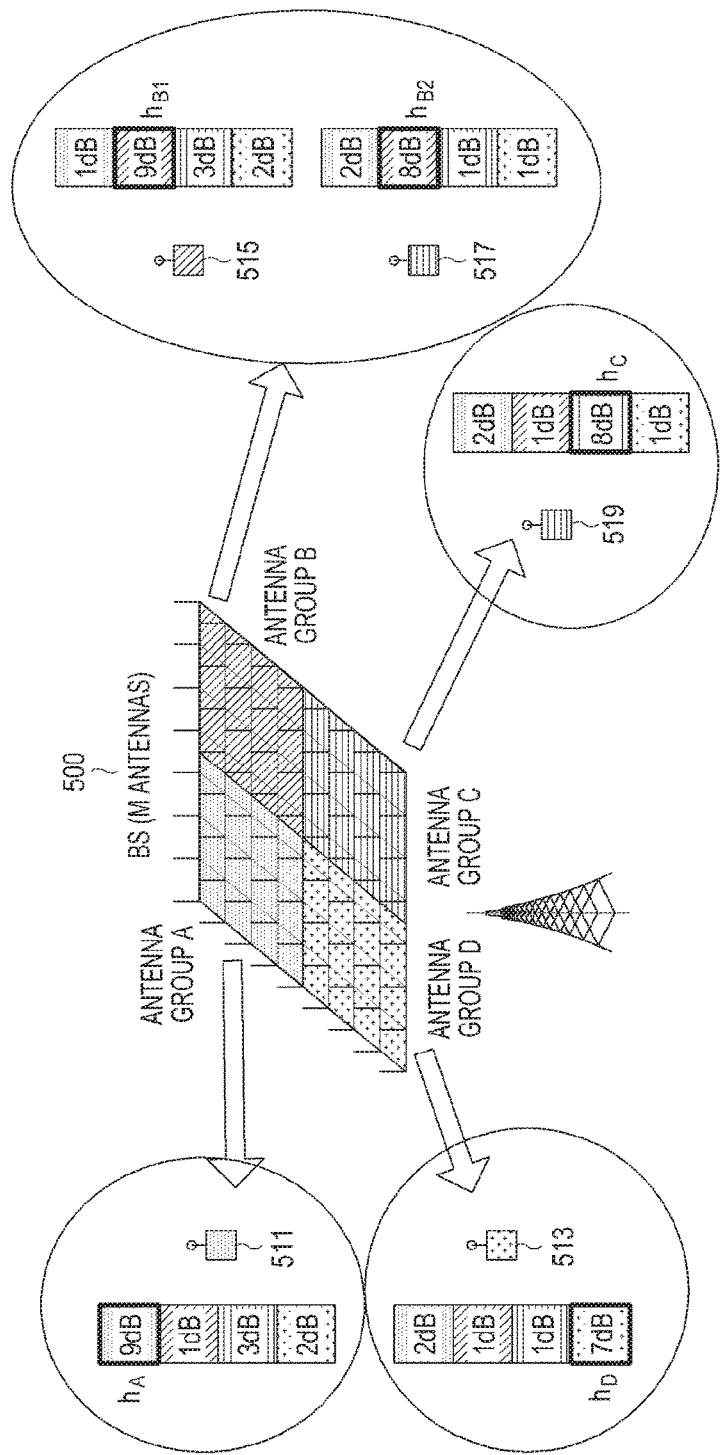
FIGS. 5A and 5B schematically illustrate an operation process of the Large-MIMO wireless communication system when a first quantization scheme according to an embodiment of the present disclosure is used.
Figure 5B:
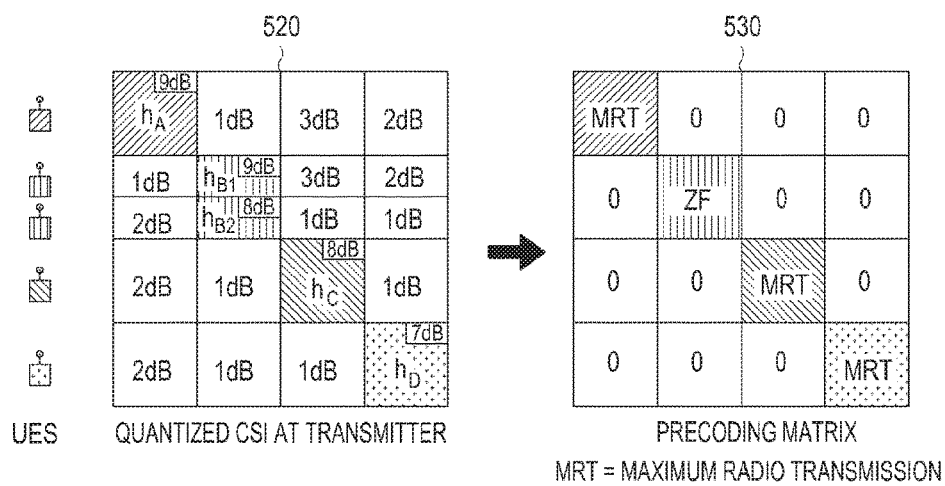

FIGS. 5A and 5B schematically illustrate an operation process of the Large-MIMO wireless communication system when the first quantization scheme according to an embodiment of the present disclosure is used.

Referring to FIGS. 5A and 5B, first, the Large-MIMO wireless communication system includes four antenna groups, that is, antenna group #A, antenna group #B, antenna group #C, and antenna group #D, and a total of four UEs, that is, UE #1 511, UE #2 513, UE #3 515, UE #4 517, and UE #5 519.

UE #1 511 selects antenna group #A, UE #2 513 selects antenna group #D, UE #3 515 selects antenna group #B, UE #4 517 selects antenna group #B, and UE #5 519 selects antenna group #C, and each of UE #1 511, UE #2 513, UE #3 515, UE #4 517, and UE #5 519 transmits feedback information including the quantized CDI for the antenna group selected by each of the UEs to the BS 500.

Then, the BS can recognize the CSI of the corresponding UE according to each antenna group as indicated by reference numeral 520 and, accordingly, generate a precoding matrix as indicated by reference numeral 530. Particularly, as indicated by reference numeral 520, the number of UEs selecting antenna group #B is 2 and, accordingly, the BS 500 provides the service to UE #3 515 and UE #4 517 by using the ZF scheme.

(2) Second Quantization Scheme

The second quantization scheme corresponds to a scheme in which the UE quantizes CDIs of the remaining antenna groups except for the antenna group selected by the UE itself. Further, the UE transmits feedback information including the quantized CDI to the BS.

In this case, since the remaining antenna groups except for the antenna group selected by the UE itself may act as interference to other UEs except for the UE itself, the BS may minimize the interference to the other UEs by using the additional transmission scheme, for example, the ZF scheme described in the first quantization scheme. Here, the additional transmission scheme may include various schemes as well as the ZF scheme, of which a detailed description is omitted.

Figure 6A:
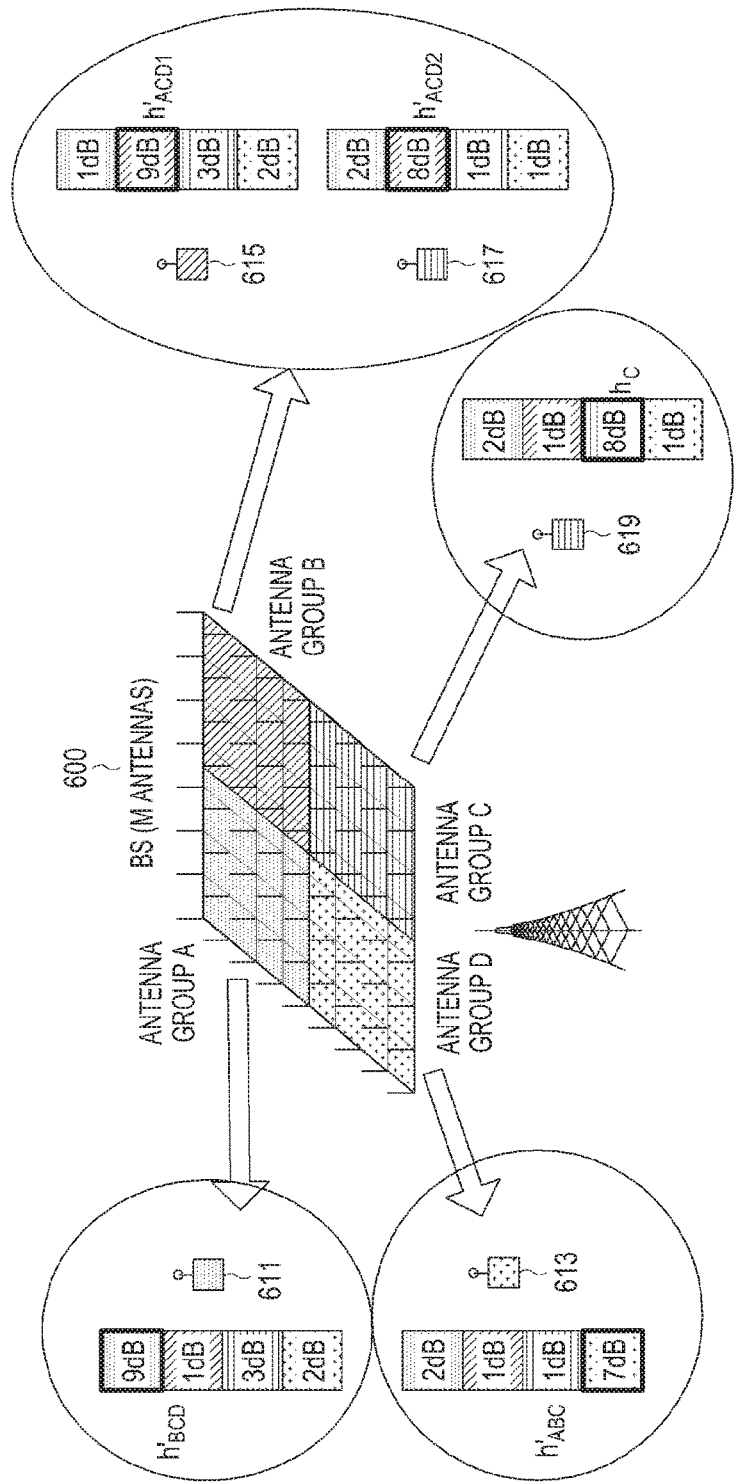
FIGS. 6A and 6B schematically illustrate an operation process of the Large-MIMO wireless communication system when a second quantization scheme according to an embodiment of the present disclosure is used.
Figure 6B:
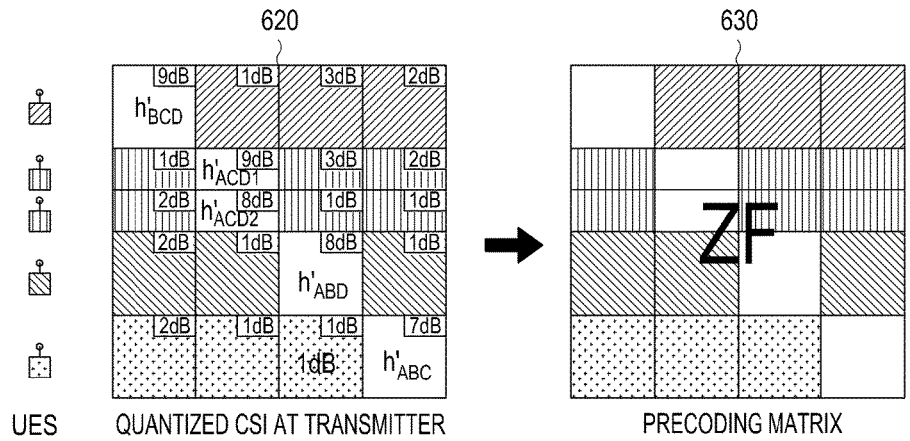

The second quantization scheme is described herein with reference to FIGS. 6A and 6B.

FIGS. 6A and 6B schematically illustrate an operation process of the Large-MIMO wireless communication system when the second quantization scheme according to an embodiment of the present disclosure is used.

Referring to FIGS. 6A and 6B, first, the Large-MIMO wireless communication system includes four antenna groups, that is, antenna group #A, antenna group #B, antenna group #C, and antenna group #D, and a total of four UEs, that is, UE #1 611, UE #2 613, UE #3 615, UE #4 617, and UE #5 619.

UE #1 611 selects antenna group #A, UE #2 613 selects antenna group #D, UE #3 615 selects antenna group #B, UE #4 617 selects antenna group #B, and UE #5 619 selects antenna group #C, and each of UE #1 611, UE #2 613, UE #3 615, UE #4 617, and UE #5 619 transmits feedback information including the quantized CDIs for the remaining antenna groups except for the antenna group selected by the UE itself to the BS 600.

Then, the BS can recognize the CSI of the corresponding UE according to each antenna group as indicated by reference numeral 620 and, accordingly, generate a precoding matrix as indicated by reference numeral 630. Particularly, when the second quantization scheme is used, since the corresponding UE transmits CSIs for the antenna groups except for the antenna group selected by the UE itself, the BS 600 provides the service to UE #1 611, UE #2 613, UE #3 615, UE #4 617, and UE #5 619 by using the ZF scheme.

Meanwhile, feedback information transmitted by all UEs in the Large-MIMO wireless communication system according to an embodiment of the present disclosure is described below with reference to Table 2 below.

TABLE 2

|  | First Selected Antenna group ID | CDI index | Average CQI | Second Selected Antenna group ID | CDI index | Average CQI |
| --- | --- | --- | --- | --- | --- | --- |
| UE #1 | B | 1 | 9 dB | A | 3 | 15 dB |
| UE #2 | D | 3 | 9 dB | C | 2 | 16 dB |
| UE #3 | C | 4 | 5 dB | A | 2 | 7 dB |
| UE #4 | A | 4 | 12 dB | D | 1 | 14 dB |

Table 2 above shows antenna groups divided into antenna group #A, antenna group #B, antenna group #C, and antenna group #D, used by the BS of the Large-MIMO wireless communication system, UEs including UE #1, UE #2, UE #3, and UE #4, to which the BS provides the service, and feedback information, which is received by the BS and transmitted by each of UE #1, UE #2, UE #3, and UE #4, when the corresponding UE selects two antenna groups as antenna groups to be included in the feedback information.

Meanwhile, the BS can select an actual user based on a result of the received feedback information shown in Table 2, which is described with reference to FIG. 7 as an example.

Figure 7:
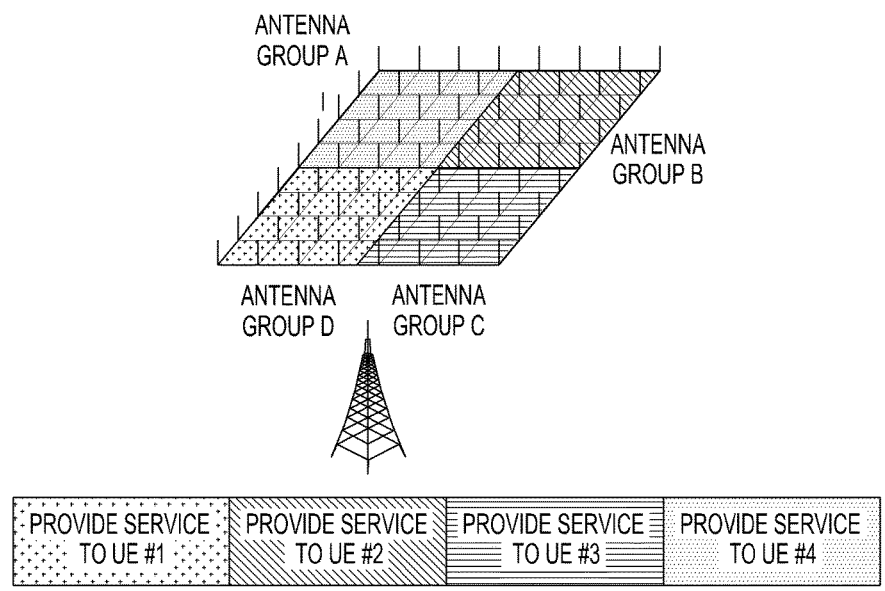
FIG. 7 schematically illustrates a process in which a BS selects a UE by using feedback information in the Large-MIMO wireless communication system according to an embodiment of the present disclosure.

FIG. 7 schematically illustrates a process in which the BS selects a UE by using feedback information in the Large-MIMO wireless communication system according to an embodiment of the present disclosure.

Prior to the description of FIG. 7, it is assumed that the BS has received feedback information from UE #1, UE #2, UE #3, and UE #4 in the form shown in Table 2.

Accordingly, the BS provides the service to UE #1 by using antenna group #B, provides the service to UE #2 by using antenna group #C and antenna group #D, and provides the service to UE #4 by using antenna group #A.

Meanwhile, UE #3 selects antenna group #C and antenna group #A and transmits the feedback information corresponding to the selected antenna groups, but the total system performance can be improved when antenna group #C is used to provide the service to UE #2 rather than to UE #3, so that antenna group #C is used to provide the service to UE #2, not UE #3. Total system performance can be improved when antenna group #A is used to provide the service to UE #4 rather than to UE #3, so that antenna group #A is used to provide the service to UE #4, not UE #3.

The process for selecting the user by using the feedback information received from the BS of the Large-MIMO wireless communication system according to an embodiment of the present disclosure has been described, and an internal structure of the BS in the Large-MIMO wireless communication system according to an embodiment of the present disclosure will be next described with reference to FIG. 8.

Figure 8:
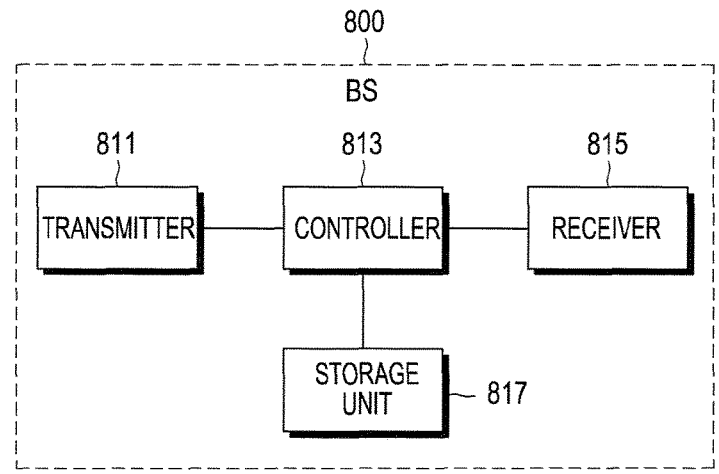
FIG. 8 schematically illustrates an internal structure of the BS in the Large-MIMO wireless communication system according to an embodiment of the present disclosure.

FIG. 8 schematically illustrates the internal structure of the BS in the Large-MIMO wireless communication system according to an embodiment of the present disclosure.

Referring to FIG. 8, a BS 800 includes a transmitter 811, a controller 813, a receiver 815, and a storage unit 817.

First, the controller 813 controls the general operation of the BS 800, and controls an operation related to the UE selection operation and the beamforming operation in the Large-MIMO wireless communication system described in FIGS. 1 to 7. Since the operation related to the UE selection operation and the beamforming operation in the Large-MIMO wireless communication system has been described in FIGS. 1 to 7, a detailed description thereof is omitted herein.

The transmitter 811 transmits various signals and various messages related to the UE selection operation and the beamforming operation in the Large-MIMO wireless communication system described in FIGS. 1 to 7 to other devices or UEs under a control of the controller 813.

Further, the receiver 815 receives various signals and various messages related to the UE selection operation and the beamforming operation in the Large-MIMO wireless communication system described in FIGS. 1 to 7 from other devices or UEs under a control of the controller 813.

The storage unit 817 stores various programs and various pieces of data related to the UE selection operation and the beamforming operation by the BS 800 in the Large-MIMO wireless communication system described in FIGS. 1 to 7. Further, the storage unit 817 stores various signals and various message received by the receiver 815.

Meanwhile, although FIG. 8 illustrates a case where the BS 800 is implemented by separate processors such as the transmitter 811, the controller 813, the receiver 815, and the storage unit 817, the BS 800 can be implemented by one processor in which the transmitter 811, the controller 813, the receiver 815, and the storage unit 817 are integrated.

The internal structure of the BS in the Large-MIMO wireless communication system according to an embodiment of the present disclosure has been described, and an internal structure of the UE in the Large-MIMO wireless communication system according to an embodiment of the present disclosure will be next described with reference to FIG. 9.

Figure 9:
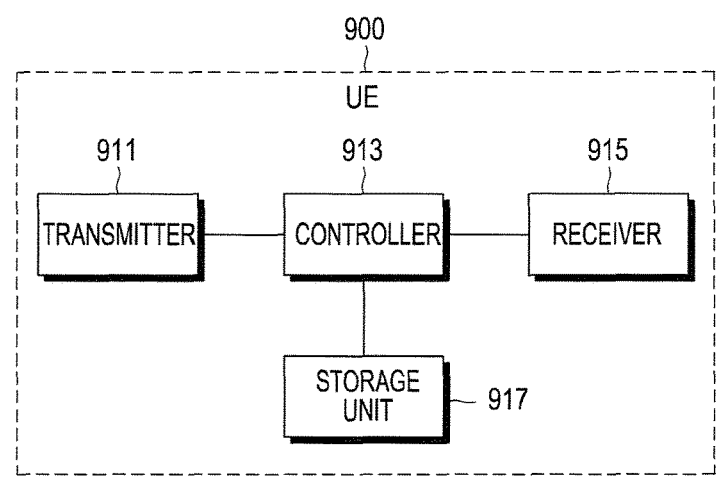
FIG. 9 schematically illustrates an internal structure of the UE in the Large-MIMO wireless communication system according to an embodiment of the present disclosure.

FIG. 9 schematically illustrates the internal structure of the UE in the Large-MIMO wireless communication system according to an embodiment of the present disclosure.

Referring to FIG. 9, a UE 900 includes a transmitter 911, a controller 913, a receiver 915, and a storage unit 917.

First, the controller 913 controls the general operation of the UE 900, and controls an operation related to the feedback information generation and transmission operation in the Large-MIMO wireless communication system described in FIGS. 1 to 7. Since the operation related to the feedback information generation and transmission operation in the Large-MIMO wireless communication system has been described in FIGS. 1 to 7, a detailed description thereof is omitted herein.

The transmitter 911 transmits various signals and various messages related to the feedback information generation and transmission operation described in FIGS. 1 to 7 to other devices or the BS under a control of the controller 913.

Further, the receiver 915 receives various signals and various messages related to the UE selection operation and the beamforming operation in the Large-MIMO wireless communication system described in FIGS. 1 to 7 from other devices or UEs under a control of the controller 813.

The storage unit 917 stores various programs and various pieces of data related to the feedback information generation and transmission operation by the UE 900 described in FIGS. 1 to 7. Further, the storage unit 917 stores various signals and various message received by the receiver 915.

Meanwhile, although FIG. 9 illustrates a case where the UE 900 is implemented by separate processors such as the transmitter 911, the controller 913, the receiver 915, and the storage unit 917, the UE 900 can be implemented by one processor in which the transmitter 911, the controller 913, the receiver 915, and the storage unit 917 are integrated.

Meanwhile, although not illustrated in a separate figure, the BS and the UEs should know each other's antenna group information in the Large-MIMO wireless communication system according to an embodiment of the present disclosure. Accordingly, in an embodiment of the present disclosure, the BS broadcasts in advance antenna group information before communication with actual UEs or informs the corresponding UE of the antenna group information when starting the communication with the actual UEs. Here, there is no limitation on the message and channel used for transmitting the antenna group information.

Further, although it is illustrated that the corresponding antenna group includes adjacent antennas in the figures used for describing the Large-MIMO wireless communication system according to an embodiment of the present disclosure, it is only an embodiment for the description and the antennas included in the corresponding antenna group can be freely selected without limit.

In addition, in an embodiment of the present disclosure, it is described that the feedback information is implemented in the form including the antenna group ID and the remaining information, for example, the CQI index and the average CQI in the Large-MIMO wireless communication system but, unlike this, the feedback information can be implemented in a codeword form considering all of the antenna group ID and the remaining information. For example, when the feedback information is implemented by two bits, a total of four codewords such as '00', '01', '10', and '11' can be expressed and, in this case, the feedback information can be generated to have a total of four levels.

An embodiment of the present disclosure has an effect of being able to perform a UE selection operation and a beamforming operation suitable for a wireless communication system supporting a MIMO scheme and a beamforming scheme.

Further, an embodiment of the present disclosure has an effect of being able to transmit/receive feedback information to efficiently perform a UE selection operation and a beamforming operation in a wireless communication system supporting a MIMO scheme and a beamforming scheme.

Accordingly, an embodiment of the present disclosure has an effect of being able to efficiently operate antennas while reducing a used amount of feedback resources in a wireless communication system supporting a MIMO scheme and a beamforming scheme.

Particular aspects of the present disclosure may be implemented as a computer-readable code in a computer-readable recording medium. The computer-readable recording medium is a predetermined data storage device which can store data which can be read by a computer system. Examples of the computer readable recording medium may include a read-only memory (ROM), a random access memory (RAM), a CD-ROM, a magnetic tape, a floppy disk, an optical data storage device, and a carrier wave (such as data transmission through the Internet). The computer-readable recording medium may be distributed through computer systems connected to the network, and accordingly the computer-readable code is stored and executed in a distributed manner. Further, functional programs, codes and code segments for achieving the present disclosure may be easily interpreted by programmers skilled in the art which the present disclosure pertains to.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present disclosure.

Accordingly, the present disclosure includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present disclosure appropriately includes equivalents of the program.

Further, an apparatus according to an embodiment of the present disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

Although the embodiment has been described in the detailed description of the present disclosure, the present disclosure may be modified in various forms without departing from the scope of the present disclosure. Therefore, the scope of the present disclosure should not be defined as being limited to the embodiments, but should be defined by the appended claims and equivalents thereof.

The invention claimed is:

1. A method of transmitting feedback information by a receiving apparatus in a wireless communication system supporting a multiple input multiple output (MIMO) scheme, the method comprising:
    selecting an antenna group among one or more antenna groups, the one or more antenna groups being divided from a plurality of antenna included in a transmitting apparatus based on a number of receiving apparatuses and a number of feedback information bits; and
    transmitting, to the transmitting apparatus, an antenna group identifier (ID) of the selected antenna group and the feedback information which includes information related to channel quality which the receiving apparatus is capable of acquiring if the at least one antenna of the selected antenna group is used,
    wherein each of the antenna groups includes one or more antennas.

2. The method of claim 1, wherein the feedback information further includes channel direction information (CDI) corresponding to the one or more antenna groups.

3. The method of claim 1, wherein the information related to the channel quality includes information related to a channel quality which the receiving apparatus is capable of acquiring, is acquired on average for an antenna group if the one or more antenna groups are used.

4. The method of claim 1, wherein a number of antenna groups used by the transmitting apparatus is less than a number of radio frequency (RF) chains used by the transmitting apparatus, wherein each RF chain comprises a controller, a transmitter and a receiver.

5. The method of claim 1, wherein a number of the antenna groups is determined based on a number of feedback information bits included in the feedback information transmitted by the receiving apparatus, transmission power used by the transmitting apparatus, a number of transmission antennas included in the transmitting apparatus, and a number of receiving apparatuses to which the transmitting apparatus provides a service.

6. The method of claim 1, wherein a number of the antenna groups is determined based on an equation of the form:

$$\mathbb{E}\left[\sum_{s \in S} \log_2\left(1 + \frac{\frac{P}{S}|h_s^\dagger v_s|^2}{1 + \sum_{i \in S\setminus\{s\}} \frac{P}{S}|h_i^\dagger v_i|^2}\right)\right] = E\left[\sum_{s \in S} \log_2\left(1 + \frac{P}{S}\|h_s\|^2|\tilde{h}_s^\dagger v_s|^2\right)\right] -$$

$$\mathbb{E}\left[\sum_{s \in S} \log_2\left(1 + \sum_{i \in S\setminus\{s\}} \frac{P}{S}\|h_i\|^2|\tilde{h}_i^\dagger v_i|^2\right)\right] \overset{(a)}{\approx}$$

$$S\log_2\left(1 + \frac{P}{S}\frac{M}{S(M-1)}\right) - S\log_2\left(1 + \frac{P}{S}\mathbb{E}\left[\min_{k \in [K]} \|h_k^c\|^2\right] 2^{-\frac{bS}{(S-1)M}}\right) \overset{(b)}{\approx}$$

$$S\log_2\left(1 + \frac{P}{S}\frac{M}{S(M-1)}\right) - S\log_2\left(1 + \frac{P}{S}K^{-\frac{S}{(S-1)M}} 2^{-\frac{bS}{(S-1)M}}\right),$$

where S denotes the number of the antenna groups, P denotes transmission power of the transmitting apparatus, M denotes a number of antennas included in the transmitting apparatus, K denotes a number of receiving apparatuses to which the transmitting apparatus provides a service, $h_s$ denotes a channel of the receiving apparatus using an $s^{th}$ antenna group, and $v_s$ denotes a beamforming vector applied to the $s^{th}$ antenna group.

7. The method of claim 1, wherein the information related to the channel quality which the receiving apparatus is capable of acquiring if the one or more antenna groups are used includes one of: information indicating the channel quality which the receiving apparatus is capable of acquiring if the one or more antenna groups are used and information indicating channel quality which the receiving apparatus is capable of acquiring if remaining antenna groups except for the one or more antenna groups are used.

8. A method of receiving feedback information by a transmitting apparatus in a wireless communication system supporting a multiple input multiple output (MIMO) scheme, the method comprising:
    grouping a plurality of antenna included in the transmitting apparatus, into one or more antenna groups based on a number of receiving apparatuses and a number of feedback information bits,
    receiving, from a receiving apparatus, an antenna group identifier (ID) of selected antenna group by the receiving apparatus and the feedback information which includes information related to channel quality which the receiving apparatus is capable of acquiring if the at least one antenna of the selected antenna group is used,
    wherein each of the antenna groups includes one or more antennas.

9. The method of claim 8, wherein the feedback information further includes channel direction information (CDI) corresponding to the one or more antenna groups.

10. The method of claim 8, wherein the information related to the channel quality is information related to channel quality which the receiving apparatus is capable of acquiring, is acquired on average for an antenna group if the one or more antenna groups are used.

11. The method of claim 8, wherein a number of the antenna groups used by the transmitting apparatus is less than a number of radio frequency (RF) chains used by the transmitting apparatus, wherein each RF chain comprises a controller, a transmitter and a receiver.

12. The method of claim 8, wherein a number of the antenna groups is determined based on of a number of feedback information bits included in the feedback information received from the receiving apparatus, transmission power used by the transmitting apparatus, a number of transmission antennas included in the transmitting apparatus, and a number of receiving apparatuses to which the transmitting apparatus provides a service.

13. The method of claim 8, wherein a number of the antenna groups is determined based on an equation of the form:

$$\mathbb{E}\left[\sum_{s \in S} \log_2\left(1 + \frac{\frac{P}{S}|h_s^\dagger v_s|^2}{1 + \sum_{i \in S\setminus\{s\}} \frac{P}{S}|h_i^\dagger v_i|^2}\right)\right] = E\left[\sum_{s \in S} \log_2\left(1 + \frac{P}{S}\|h_s\|^2|\tilde{h}_s^\dagger v_s|^2\right)\right] -$$

$$\mathbb{E}\left[\sum_{s \in S} \log_2\left(1 + \sum_{i \in S\setminus\{s\}} \frac{P}{S}\|h_i\|^2|\tilde{h}_i^\dagger v_i|^2\right)\right] \overset{(a)}{\approx}$$

$$S\log_2\left(1 + \frac{P}{S}\frac{M}{S(M-1)}\right) - S\log_2\left(1 + \frac{P}{S}\mathbb{E}\left[\min_{k \in [K]} \|h_k^c\|^2\right] 2^{-\frac{bS}{(S-1)M}}\right) \overset{(b)}{\approx}$$

-continued $$S\log_2\left(1 + \frac{P}{S}\frac{M}{S(M-1)}\right) - S\log_2\left(1 + \frac{P}{S}K^{-\frac{S}{(S-1)M}}2^{-\frac{bS}{(S-1)M}}\right),$$

where S denotes the number of the antenna groups, P denotes transmission power of the transmitting apparatus, M denotes a number of antennas included in the transmitting apparatus, K denotes a number of receiving apparatuses to which the transmitting apparatus provides a service, $h_s$ denotes a channel of the receiving apparatus using an $s^{th}$ antenna group, and $v_s$ denotes a beamforming vector applied to the $s^{th}$ antenna group.

14. The method of claim 8, wherein the information related to the channel quality which the receiving apparatus is capable of acquiring if the one or more antenna groups are used includes one of: information indicating the channel quality which the receiving apparatus is capable of acquiring if the one or more antenna groups are used and information indicating a channel quality which the receiving apparatus is capable of acquiring if remaining antenna groups except for the one or more antenna groups are used among the antenna groups.

15. A receiving apparatus in a wireless communication system supporting a multiple input multiple output (MIMO) scheme, the receiving apparatus comprising:
    a transmitter; and
    a controller configured to:
    select an antenna group among one or more antenna groups, the one or more antenna groups being divided from a plurality of antenna included in a transmitting apparatus based on a number of receiving apparatus and a number of feedback information bits; and
    control the transmitter to transmit, to the transmitting apparatus, an antenna group identifier (ID) of the selected antenna group and feedback information which includes information related to channel quality which the receiving apparatus is capable of acquiring if at least one antenna of the selected antenna group is used,
    wherein each of the antenna groups includes one or more antennas.

16. The receiving apparatus of claim 15, wherein the feedback information further includes channel direction information (CDI) corresponding to the one or more antenna groups.

17. The receiving apparatus of claim 15, wherein the information related to the channel quality includes information related to a channel quality which the receiving apparatus is capable of acquiring, is acquired on average for an antenna group if the one or more antenna groups are used.

18. The receiving apparatus of claim 15, wherein a number of antenna groups used by the transmitting apparatus is less than a number of radio frequency (RF) chains used by the transmitting apparatus, wherein each RF chain comprises a receiver.

19. The receiving apparatus of claim 15, wherein a number of the antenna groups is determined based on a number of feedback information bits included in the feedback information transmitted by the receiving apparatus, transmission power used by the transmitting apparatus, a number of transmission antennas included in the transmitting apparatus, and a number of receiving apparatuses to which the transmitting apparatus provides a service.

20. The receiving apparatus of claim 15, wherein the information related to the channel quality which the receiving apparatus is capable of acquiring if the one or more antenna groups are used includes one of information indicating the channel quality which the receiving apparatus is capable of acquiring if the one or more antenna groups are used and information indicating channel quality which the receiving apparatus is capable of acquiring if remaining antenna groups except for the one or more antenna groups are used among the antenna groups.

* * * * *